United States Patent
Tiirola et al.

(10) Patent No.: US 10,420,098 B2
(45) Date of Patent: Sep. 17, 2019

(54) METHOD, APPARATUS, SYSTEM AND COMPUTER PROGRAM FOR LTE CARRIER BANDWIDTH EXTENSION USING INCREASED SUBCARRIER SPACING

(71) Applicant: Nokia Solutions and Networks Oy, Espoo (FI)

(72) Inventors: Esa Tapani Tiirola, Kempele (FI); Eeva Lahetkangas, Kiiminki (FI); Kari Juhani Hooli, Oulu (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/557,695

(22) PCT Filed: Mar. 17, 2015

(86) PCT No.: PCT/EP2015/055490
§ 371 (c)(1),
(2) Date: Sep. 12, 2017

(87) PCT Pub. No.: WO2016/146165
PCT Pub. Date: Sep. 22, 2016

(65) Prior Publication Data
US 2018/0063838 A1  Mar. 1, 2018

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0007* (2013.01); *H04L 27/2602* (2013.01); *H04L 5/001* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2009/0028042 A1* | 1/2009 | Chin | .......... H04L 27/2657 370/203 |
| 2009/0207853 A1* | 8/2009 | Mueller-Weinfurtner | ........... H04L 27/2647 370/465 |

(Continued)

FOREIGN PATENT DOCUMENTS

| | | |
|---|---|---|
| WO | 2008097038 | 8/2008 |
| WO | 2009052420 | 4/2009 |

(Continued)

OTHER PUBLICATIONS

International Search Report and Written Opinion received for corresponding Patent Cooperation Treaty Application No. PCT/EP2015/055490, dated Nov. 24, 2015, 12 pages.

*Primary Examiner* — Marcus Smith
*Assistant Examiner* — Gautam Sharma
(74) *Attorney, Agent, or Firm* — Harrington & Smith (57) ABSTRACT

There is provided a method comprising providing, in dependence on a first subcarrier spacing of a first subframe structure, a second subcarrier spacing of a second subframe structure, wherein the first subframe structure has a first subframe length and at least one first cyclic prefix length and providing a second subframe length of the second subframe structure, the second subframe length comprising m symbols, wherein each symbol contains a second cyclic prefix, the second cyclic prefix length modified by a length variant.

16 Claims, 7 Drawing Sheets

(51) Int. Cl.
*H04L 27/26* (2006.01)
*H04W 84/04* (2009.01)

(56) References Cited

U.S. PATENT DOCUMENTS

| | | | |
|---|---|---|---|
| 2012/0033589 A1* | 2/2012 | Zheng | H04W 99/00 |
| | | | 370/280 |
| 2013/0051485 A1 | 2/2013 | Taori et al. | |
| 2015/0043491 A1* | 2/2015 | Eng | H04W 16/14 |
| | | | 370/329 |
| 2015/0256308 A1* | 9/2015 | Ma | H04L 5/0035 |
| | | | 370/330 |
| 2015/0358983 A1* | 12/2015 | Frenger | H04L 1/0006 |
| | | | 370/329 |
| 2016/0294521 A1* | 10/2016 | Au | H04L 5/0007 |

FOREIGN PATENT DOCUMENTS

| | | |
|---|---|---|
| WO | 2010047511 | 4/2010 |
| WO | 2010138921 | 12/2010 |
| WO | 2014139562 | 9/2014 |

* cited by examiner

METHOD, APPARATUS, SYSTEM AND COMPUTER PROGRAM FOR LTE CARRIER BANDWIDTH EXTENSION USING INCREASED SUBCARRIER SPACING

RELATED APPLICATION

This application was originally filed as PCT Application No. PCT/EP2015/055490 filed Mar. 17, 2015.

FIELD

The present application relates to a method, apparatus, system and computer program and in particular but not exclusively, to LTE-A (5G) and modifying subcarrier spacing.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

SUMMARY OF THE INVENTION

In a first aspect there is provided a method comprising providing, in dependence on a first subcarrier spacing of a first subframe structure, a second subcarrier spacing of a second subframe structure, wherein the first subframe structure has a first subframe length and at least one first cyclic prefix length and providing a second subframe length of the second subframe structure, the second subframe length comprising m symbols, wherein each symbol contains a second cyclic prefix, the second cyclic prefix length modified by a length variant.

Determining the second subcarrier spacing may comprise applying a scaling factor n to the first subcarrier spacing.

n may be one of 2, 4, 5, 8 and 10.

Providing the second subframe length may comprise applying scaling factor n to the first subframe length.

The second cyclic prefix length variant may be $$\frac{T_N - \frac{M}{\Delta f}}{M},$$

where $\Delta f$ is second subcarrier spacing, $T_N$ is first subframe length divided by factor n and multiplied by factor N, wherein N is the number of sunframes, and M is the number of symbols per $T_N$ in the second subframe structure.

A sum of second cyclic prefix length variants over M symbols may be $$T_N - \frac{M}{\Delta f},$$

where $\Delta f$ is second subcarrier spacing, $T_N$ is first subframe length divided by factor n and multiplied by factor N, wherein N is the number of subframes, and M is the number of symbols per $T_N$ in the second subframe structure.

Second cyclic prefix length may vary between symbols of the second subframe.

Providing the second subframe length may comprise applying scaling factor n to the first subframe length and defining second subframe length as $$\frac{x \times \text{first subframe length}}{y},$$

wherein x and y are positive integers.

The second cyclic prefix length variant may be dependent on targeted delay spread of the radio channel, tolerated cyclic prefix overhead and alignment of second subframe length and LTE radio frame.

The first subframe length may comprise m symbols.

m may be 12 or m may be 14.

When m=14, a procedure defined for LTE/normal cyclic prefix length may be applied for the second subframe structure.

When m=12, a procedure defined for LTE/extended cyclic prefix length may be applied for the second subframe structure.

Symbol length may be proportional to the second subcarrier spacing.

The first channel spacing may be 15 kHz.

The first subframe length may be 1 ms.

The second subframe structure may be one of frequency domain duplexing and time domain duplexing.

In a second aspect there is provided an apparatus comprising means for providing, in dependence on a first subcarrier spacing of a first subframe structure, a second subcarrier spacing of a second subframe structure, wherein the first subframe structure has a first subframe length and at least one first cyclic prefix length and means for providing a second subframe length of the second subframe structure, the second subframe length comprising m symbols, wherein each symbol contains a second cyclic prefix, the second cyclic prefix length modified by a length variant.

Means for determining the second subcarrier spacing may comprise means for applying a scaling factor n to the first subcarrier spacing.

n may be one of 2, 4, 5, 8 and 10.

Means for providing the second subframe length may comprise means for applying scaling factor n to the first subframe length.

The second cyclic prefix length variant may be $$\frac{T_N - \frac{M}{\Delta f}}{M},$$

where $\Delta f$ is second subcarrier spacing, $T_N$ is first subframe length divided by factor n and multiplied by factor N, wherein N is the number of subframes, and M is the number of symbols per $T_N$ in the second subframe structure.

A sum of second cyclic prefix length variants over M symbols may be $$T_N - \frac{M}{\Delta f},$$

where $\Delta f$ is second subcarrier spacing, $T_N$ is first subframe length divided by factor n and multiplied by factor N, wherein N is the number of subframes, and M is the number of symbols per $T_N$ in the second subframe structure.

Second cyclic prefix length may vary between symbols of the second subframe.

Means for providing the second subframe length may comprise means for applying scaling factor n to the first subframe length and means for defining second subframe length as $$\frac{x \times \text{first subframe length}}{y},$$

wherein x and y are positive integers.

The second cyclic prefix length variant may be dependent on targeted delay spread of the radio channel, tolerated cyclic prefix overhead and alignment of second subframe length and LTE radio frame.

The first subframe length may comprise m symbols.

m may be 12 or m may be 14.

When m=14, a procedure defined for LTE/normal cyclic prefix length may be applied for the second subframe structure.

When m=12, a procedure defined for LTE/extended cyclic prefix length may be applied for the second subframe structure.

Symbol length may be proportional to the second subcarrier spacing.

The first channel spacing may be 15 kHz.

The first subframe length may be 1 ms.

The second subframe structure may be one of frequency domain duplexing and time domain duplexing.

In a third aspect there is provided an apparatus said apparatus comprising at least one processor and at least one memory including computer program code, the at least one memory and the computer program code configured to, with the at least one processor, cause the apparatus at least to:

providing, in dependence on a first subcarrier spacing of a first subframe structure, a second subcarrier spacing of a second subframe structure, wherein the first subframe structure has a first subframe length and at least one first cyclic prefix length and providing a second subframe length of the second subframe structure, the second subframe length comprising m symbols, wherein each symbol contains a second cyclic prefix, the second cyclic prefix length modified by a length variant.

The apparatus may be configured to apply a scaling factor n to the first subcarrier spacing.

n may be one of 2, 4, 5, 8 and 10.

The apparatus may be configured to apply scaling factor n to the first subframe length.

The second cyclic prefix length variant may be $$\frac{T_N - \frac{M}{\Delta f}}{M},$$

where $\Delta f$ is second subcarrier spacing, $T_N$ is first subframe length divided by factor n and multiplied by factor N, wherein N is the number of subframes, and M is the number of symbols per $T_N$ in the second subframe structure.

A sum of second cyclic prefix length variants over M symbols may be $$T_N - \frac{M}{\Delta f},$$

where $\Delta f$ is second subcarrier spacing, $T_N$ is first subframe length divided by factor n and multiplied by factor N, wherein N is the number of subframes, and M is the number of symbols per $T_N$ in the second subframe structure.

Second cyclic prefix length may vary between symbols of the second subframe.

The apparatus may be configured to apply scaling factor n to the first subframe length and define second subframe length as $$\frac{x \times \text{first subframe length}}{y},$$

wherein x and y are positive integers.

The second cyclic prefix length variant may be dependent on targeted delay spread of the radio channel, tolerated cyclic prefix overhead and alignment of second subframe length and LTE radio frame.

The first subframe length may comprise m symbols.

m may be 12 or m may be 14.

When m=14, a procedure defined for LTE/normal cyclic prefix length may be applied for the second subframe structure.

When m=12, a procedure defined for LTE/extended cyclic prefix length may be applied for the second subframe structure.

Symbol length may be proportional to the second subcarrier spacing.

The first channel spacing may be 15 kHz.

The first subframe length may be 1 ms.

The second subframe structure may be one of frequency domain duplexing and time domain duplexing.

In a fourth aspect there is provided a computer program embodied on a non-transitory computer-readable storage medium, the computer program comprising program code for controlling a process to execute a process, the process comprising providing, in dependence on a first subcarrier spacing of a first subframe structure, a second subcarrier spacing of a second subframe structure, wherein the first subframe structure has a first subframe length and at least one first cyclic prefix length and providing a second subframe length of the second subframe structure, the second subframe length comprising m symbols, wherein each symbol contains a second cyclic prefix, the second cyclic prefix length modified by a length variant.

Determining the second subcarrier spacing may comprise applying a scaling factor n to the first subcarrier spacing.

n may be one of 2, 4, 5, 8 and 10.

Providing the second subframe length may comprise applying scaling factor n to the first subframe length.

The second cyclic prefix length variant is $$\frac{T_N - \frac{M}{\Delta f}}{M},$$

where $\Delta f$ is second subcarrier spacing, $T_N$ is first subframe length divided by factor n and multiple by factor N, wherein N is the number of subframes, and M is the number of symbols per $T_N$ in the second subframe structure.

A sum of second cyclic prefix length variants over M symbols may be $$T_N - \frac{M}{\Delta f},$$

where $\Delta f$ is second subcarrier spacing, $T_N$ is first subframe length divided by factor n and multiplied by factor N, wherein N is the number of subframes, and M is the number of symbols per $T_N$ in the second subframe structure.

Second cyclic prefix length may vary between symbols of the second subframe.

Providing the second subframe length may comprise applying scaling factor n to the first subframe length and defining second subframe length as $$\frac{x \times \text{first subframe length}}{y},$$

wherein x and y are positive integers.

The second cyclic prefix length variant may be dependent on targeted delay spread of the radio channel, tolerated cyclic prefix overhead and alignment of second subframe length and LTE radio frame.

The first subframe length may comprise m symbols.

m may be 12 or m may be 14.

When m=14, a procedure defined for LTE/normal cyclic prefix length may be applied for the second subframe structure.

When m=12, a procedure defined for LTE/extended cyclic prefix length may be applied for the second subframe structure.

Symbol length may be proportional to the second subcarrier spacing.

The first channel spacing may be 15 kHz.

The first subframe length may be 1 ms.

The second subframe structure may be one of frequency domain duplexing and time domain duplexing.

In an fifth aspect there is provided a computer program product for a computer, comprising software code portions for performing the steps the method of the first and/or second aspects when said product is run on the computer.

In the above, many different embodiments have been described. It should be appreciated that further embodiments may be provided by the combination of any two or more of the embodiments described above.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
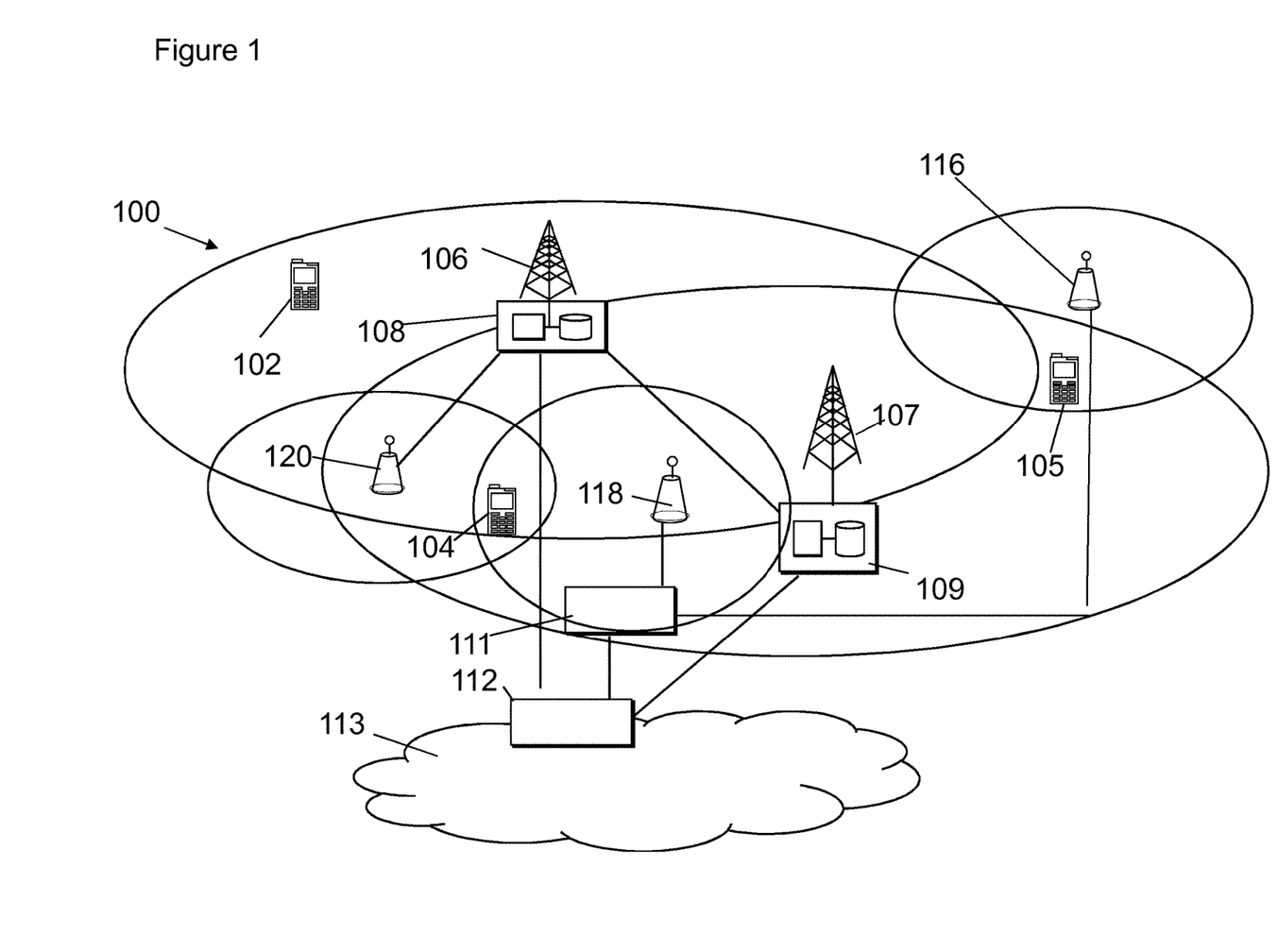
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller. The control apparatus may provide an apparatus such that discussed in relation to FIG. 8.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

The embodiments are not, however, restricted to the system given as an example but a person skilled in the art may apply the solution to other communication systems provided with necessary properties.

Figure 2:
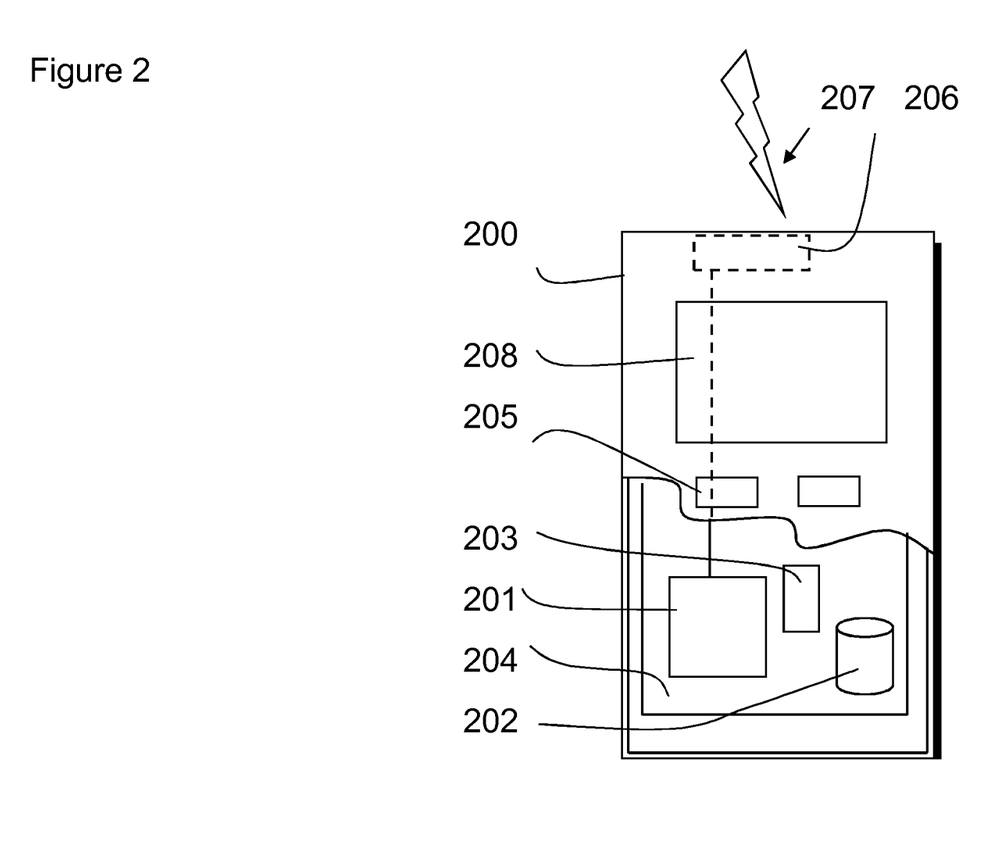
FIG. 2 shows a schematic diagram, of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chip-sets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). A base station can provide coverage for an entire cell or similar radio service area.

Another example of a suitable communications system is the 5G concept. Network architecture in 5G may be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Considerable and continuous increase on user expectations on achievable and peak user data rates is predicted, motivating wider bandwidth operation at higher frequency bands. The expectations can be met with access to new spectrum and with support of wider bandwidths.

Table 1 summarizes the available cmWave frequency band candidates for 10-30 GHz range, including "medium" and "high" priority band assessment of ultra-densely deployed MBB (Mobile Broad band) networks, emphasizing short range usage (and European situation) and wide area IMT cellular system co-existing with the currently deployed systems in the band (larger focus in outdoor deployments).

TABLE 1

| Frequency band (GHz) | Available contiguous bandwidth (>0.5 GHz) |
|---|---|
| 10-10.6 | 0.6 |
| 14-15.35 | 1.35 |
| 15.7-17.3 | 1.6 |
| 27.5-29.5 | 2 |

LTE has been designed for 2 GHz carrier frequency and LTE performance may start to decrease with increasing carrier frequency. Reasons for the performance degradation may include increased path loss, increased sensitivity to UE velocity (PRACH may start to limit UE velocities at above 10 GHz), decreased link performance due to increased channel estimation loss and sensitivity to UE velocity, decreased link adaptation/MIMO performance and/or increased Inter Carrier Interference due to increased Doppler and phase noise.

Time/Frequency, or T-F, scaling (a.k.a. LTE upscaling) has been proposed to address issues related to LTE operation at higher carrier frequencies. T-F scaling involves the extension of LTE carrier bandwidth by increasing the subcarrier spacing. Subcarrier spacing may be increased by, e.g. a factor of 2, 4, 5, 8 and/or 10, resulting in 40/80/100/160/200 MHz carrier bandwidths. Carrier aggregation can be applied on top to reach the desired aggregate bandwidth, e.g., 200 MHz.

The following relates to extending LTE to support higher carrier frequencies (i.e. frequencies above 6 GHz) with minimum changes compared to LTE.

Table 2 shows LTE numerology with normal cyclic prefix (CP) length and T-F scaling with three different values of the scaling factor n, namely 2, 4 and 8. It can be noted that in the T-F scaling, time domain parameters such as symbol length, CP length and TTI length are scaled down (compared to LTE) by parameter n, whereas frequency domain parameters such as bandwidth and subcarrier spacing are scaled up by parameter n.

TABLE 2

| | LTE | T-F scaling, n = 2 | T-F scaling, n = 4 | T-F scaling, n = 8 |
|---|---|---|---|---|
| Bandwidth [MHz] | 20 | 40 | 80 | 160 |
| Spectrum usage efficiency | 0.9 | 0.9 | 0.9 | 0.9 |
| Clock Rate [Msample/s] | 30.72 | 61.44 | 122.88 | 245.76 |
| Subcarrier spacing [kHz] | 15 | 30 | 60 | 120 |
| OFDM symbol [µs] | 66.67 | 33.33 | 16.67 | 8.33 |

TABLE 2-continued

| | LTE | T-F scaling, n = 2 | T-F scaling, n = 4 | T-F scaling, n = 8 |
|---|---|---|---|---|
| samples per FFT block | 2048 | 2048 | 2048 | 2048 |
| # effective sub-carriers | 1200 | 1200 | 1200 | 1200 |
| # zero sub-carriers | 848 | 848 | 848 | 848 |
| sub-frame length [ms] | 1 | 0.5 | 0.25 | 0.125 |
| CP [µs] | 4.76 | 2.38 | 1.19 | 0.60 |
| CP Overhead [%] | 6.67 | 6.67 | 6.67 | 6.67 |
| CCs for 160 MHz BW | 8 | 4 | 2 | 1 |

As shown in table 2 and in table 3, CP time decreases linearly with increased scaling factor. Hence, the propagation environment will set a limit for the maximum scaling factor (n). Wider bandwidth based on T-F-scaled LTE may not be supported in large cells.

Upon entry of the present amendment, this paragraph will read:

As shown in table 2 and in table 3, CP time decreases linearly with increased scaling factor. Hence, the propagation environment will set a limit for the maximum scaling factor (n). Wider bandwidth based on T-F-scaled LTE may not be supported in large cells.

TABLE 3

| Scaling factor | LTE | 2 | 4 | 8 | 16 |
|---|---|---|---|---|---|
| normal CP [µs] | 4.76 | 2.38 | 1.19 | 0.60 | 0.30 |
| Extended CP [µs] | 16.67 | 8.33 | 4.17 | 2.08 | 1.04 |

The following relates to enhanced flexibility for LTE upscaling (or downscaling, which corresponds to decrease of the subcarrier spacing compared to LTE) with respect to CP length and, hence, supported radio environments while maintaining reasonable commonality with LTE.

Figure 3:
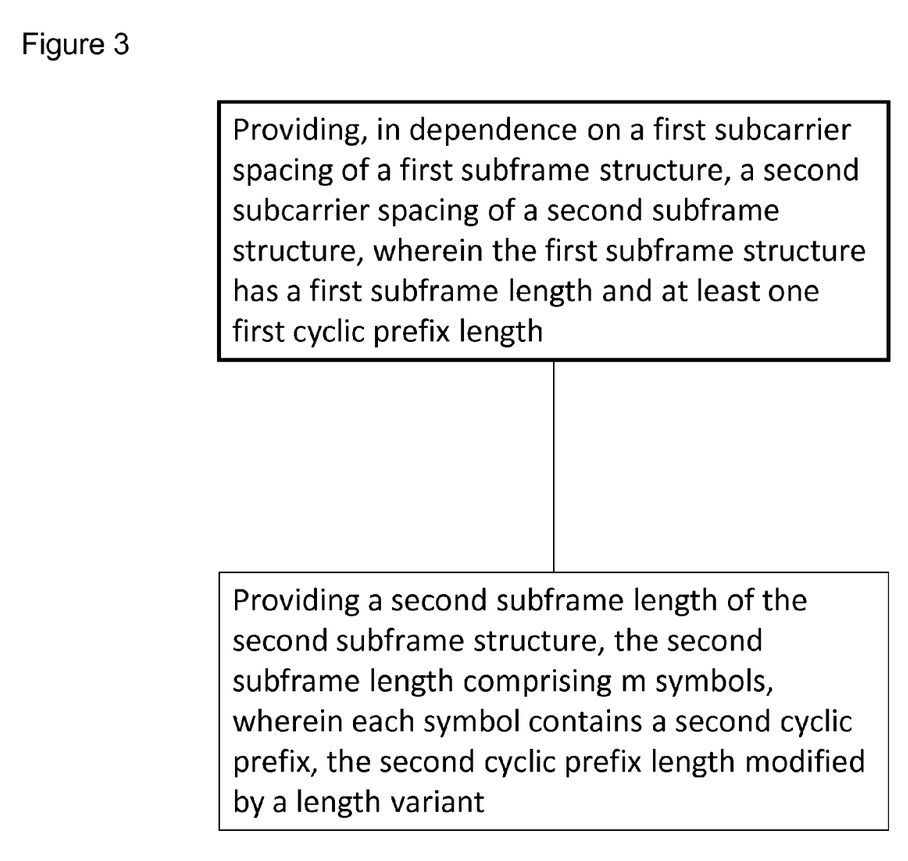
FIG. 3 shows a flowchart of an example method of increasing subcarrier spacing.

FIG. 3 shows a flowchart of an example method of increasing subcarrier spacing. The method comprises, in a first step, providing, in dependence on a first subcarrier spacing of a first subframe structure, a second subcarrier spacing of a second subframe structure, wherein the first subframe structure has a first subframe length and at least one first cyclic prefix length and, in a second step, providing a second subframe length of the second subframe structure, the second subframe length comprising m symbols, wherein each symbol contains a second cyclic prefix, the second cyclic prefix length modified by a length variant.

Determining a second subcarrier spacing in dependence on a first subcarrier spacing may comprise defining a subcarrier spacing based on T-F scaling principle. The first subframe structure may be either Normal CP mode, 14 symbols per TTI, or Extended CP mode, 12 symbols per TTI. Determining the second subcarrier spacing may comprise applying a scaling factor, n, to the first subcarrier spacing. n may be, for example, one of 2, 4, 5, 8 and 10.

Symbol length may be proportional to the second subcarrier spacing. For example, symbol length (excluding CP length) may be determined by 1/second subcarrier spacing.

In one embodiment, determining the second subframe length may comprise applying scaling factor n to the first subframe length. The second CP length may then be modified using a CP length variant.

One definition of a CP length variant may be $$\frac{T_N - \frac{M}{\Delta f}}{M},$$

wherein Δf is second subcarrier spacing, $T_N$ is time duration for N subframes (N⊂[1, 2, . . . ]) and M is the number of OFDMA symbols corresponding to N subframes. $T_N$ may be the first subframe length divided by scaling factor n and multiplied by the number of subframes N. The duration of useful signal part (out of $T_N$) can be calculated as $$\frac{M}{\Delta f}.$$

The duration of UP part may then be defined as $$T_N - \frac{M}{\Delta f}.$$

CP part is typically shared evenly among OFDMA symbols. Hence, the CP length may be defined as calculated as:

$$T_N - \frac{M}{\Delta f}.$$

CP part may also be shared unevenly among OFDMA symbols. The first subframe may contain multiple CP lengths. For example, the CP of the first symbol in a subframe, or the CP of the first symbol in a slot, or a half subframe, may be longer than the CPs of other symbols. In a such case, one definition of a CP length variant may be that the total sum of CPs or total CP part in M symbols is $$\frac{T_N - \frac{M}{\Delta f}}{M},$$

wherein Δf is second subcarrier spacing, $T_N$ is time duration for N subframes (N∈[1, 2, . . . ]) and M is the number of OFDMA symbols corresponding to N subframes. $T_N$ may be the first subframe length divided by scaling factor n and multiplied by the number of subframes N. The duration of useful signal part (out of $T_N$) can be calculated as $$\frac{M}{\Delta f}.$$

The duration of CP part may then be defined as $$T_N - \frac{M}{\Delta f}.$$

CP part may be shared unevenly among OFDMA symbols by keeping the same ratio between different CP lengths within the second subframe as in the first subframe.

Second subframe length, may be provided by applying scaling factor n to the first subframe length. Alternatively, the $T_N$ may be $$\frac{x \times \text{first subframe length}}{y},$$

wherein x and y are positive integers. x and y may be different positive integers.

The number of symbols, m, in the second subframe length, or second subframe TTI, may be the same as the number of symbols in the first subframe length. In an embodiment, determining a number of symbols in a transmission time interval (TTI) for the modified cyclic prefix length may comprise defining the TTI to contain the same number of symbols as LTE subframe. For example, for Normal CP mode the TTI may be defined to contain 14 symbols at the modified CP length. For Extended CP mode, the TTI may be defined to have 12 symbols at the modified CP length.

The second subframe TTI may be aligned with LTE timing. For example, multiples of new TTIs may be aligned with LTE radio frame (10 ms). Alternatively, multiples of new TTIs may be aligned with multiples of LTE radio frames. It is also possible that multiples of new TTIs may be aligned with multiples of LTE subframes (each 1 ms).

An example is shown in Table 4. In the first column of table 4, LTE with normal CP is shown as a reference case, and, in the second column T-F scaling with normal CP, where n=4 is used as another reference. The third column shows T-F scaling, where n=4 and the modified CP is provided. In this example, $T_N$ is determined by applying scaling factor n to the first subframe length.

A CP length/numerology is based on the following assumptions and equation given above. In this example, M=10, $T_N$=0.25 ms and CP length=8.33 us.

TABLE 4

| | LTE normal CP | T-F-scaling, n = 4 normal CP | T-F-scaling, n = 4 large CP |
|---|---|---|---|
| TTI length [ms] | 1 | 0.25 | 0.25 |
| Subcarrier spacing [kHz] | 15 | 60 | 60 |
| # of OFDMA Symbols/TTI | 14 | 14 | 10 |
| CP time [μs] | 4.76 | 1.19 | 8.33 |
| CP overhead [%] | 6.67 | 6.67 | 33.33 |
| Symbol duration [μs] | 66.7 | 16.7 | 16.7 |
| Symbol duration (incl. CP) [μs] | 71.4 | 17.9 | 25.0 |

Figure 4:
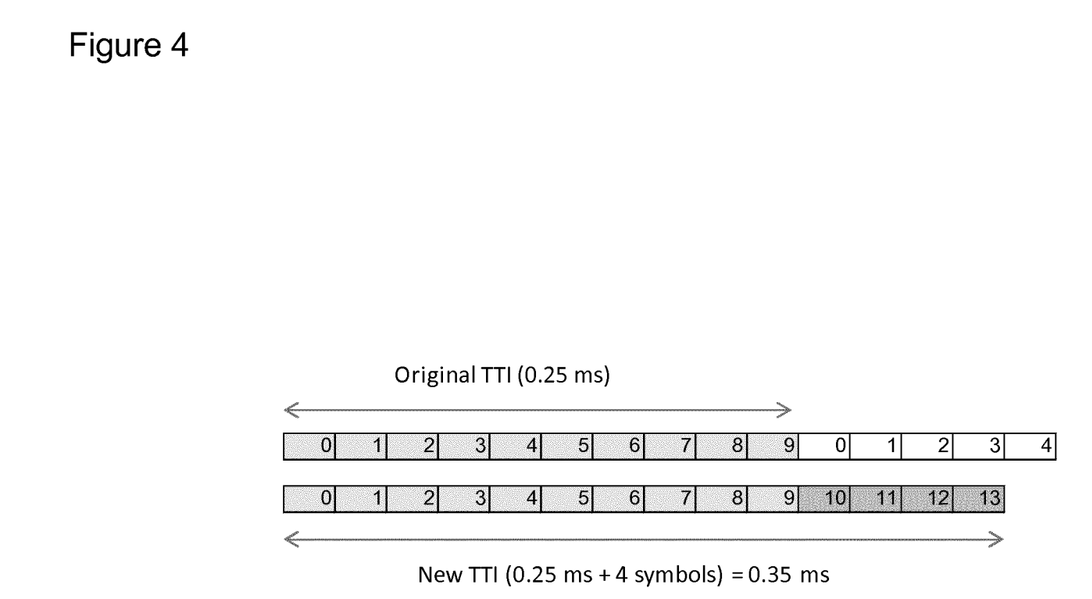
FIG. 4 shows symbols of an example TTI.

FIG. 4 shows an example of how the second subframe length, or HI length for the second subframe structure, may be adjusted by fixing the subcarrier spacing to be the same as for the T-F upscaled LTE and assigning the number of OFDM symbols/TTI to be 14 (or 12 in the case of Extended CP mode) symbols. The modified TTI comprises 14 symbols of length 25 μs. The second subframe length, or TTI length is 0.35 ms. In an embodiment for Extended CP Mode, the TTI would comprise 12 symbols. Based on the current selections, the proposed air interface may be compatible with LTE PHY specification (either normal CP or extended CP) with minimum changes. For example, RS structures, control channel structures, transport block size may be borrowed directly from current LTE specifications.

An example is shown in Table 5. In the first column of table 5, LTE with normal CP is shown as a reference case, and, in the second column T-F scaling with normal CP, where n=4 is used as another reference. The third column shows T-F scaling, where n=4 and the modified CP is provided. In this example, $T_N$ is determined by $$\frac{x \times \text{first subframe length}}{y}.$$

The CP length may be calculated for example so that it allows certain alignment between the TTI lengths of the T-F upscaled LTE and the new TTI with large CP (or any adjusted CP) configuration.

TABLE 5

|  | LTE normal CP | T-F-scaling, n = 4 normal CP | New TTI, larger CP |
|---|---|---|---|
| TTI length [ms] | 1 | 0.25 | 0.375 |
| Subcarrier spacing [kHz] | 15 | 60 | 60 |
| # of OFDMA Symbols/TTI | 14 | 14 | 14 |
| CP time [µs] | 4.76 | 1.19 | 10.12 |
| CP overhead [%] | 6.67 | 6.67 | 37.78 |
| Symbol duration [µs] | 66.67 | 16.67 | 16.67 |
| Symbol duration (incl. CP) [µs] | 71.4 | 17.9 | 26.8 |

Figure 5:
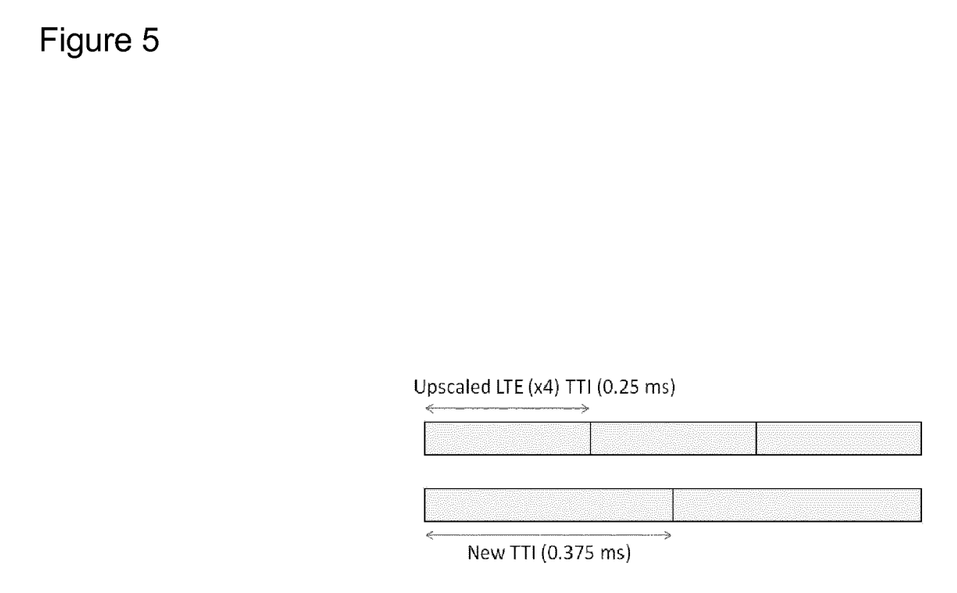
FIG. 5 shows symbols of an example TTI.

FIG. 5 illustrates an example where the length of 3 TTIs of upscaled LTE correspond to the length of 2 TTIs of the new TTI configuration.

Alternatively CP length may be defined according to predefined criteria, e.g. based on the targeted delay spread of the radio channel, tolerated CP overhead and alignment of new TTI length and legacy LTE.

In an embodiment, the CP length is defined in a way that certain time alignment between LTE and T-F upscaled New Numerology can be achieved. The New Numerology may be define for a group of cells, operating in a certain radio environment and operating on a given carrier frequency. This will provide the enhanced flexibility to trade-off CP overhead and the CP length.

Defining the new TTI length to contain the same number of symbols as LTE subframe helps to avoid considerable LTE redesign as the system may operate according to LTE normal CP or LTE extended CP procedures defined (e.g.) in TS 36.21x specifications. Defining certain time alignment cross LTE and T-F scaled LTE can facilitate cross-RAT procedures.

In an embodiment the new numerology may be defined for a group of cells, operating in certain radio environment and operating on a given carrier frequency. This approach may be applied for both FDD and TDD versions of the specification or either one of those.

An approach such as that discussed above may provide full flexibility for T-F scaling in terms for scaling factor and in terms of CP overhead. The key advantage of T-F scaling may be maintained and the anticipated specification changes are relatively minor compared to, for example, redefining OFDMA numerology.

Figure 6:
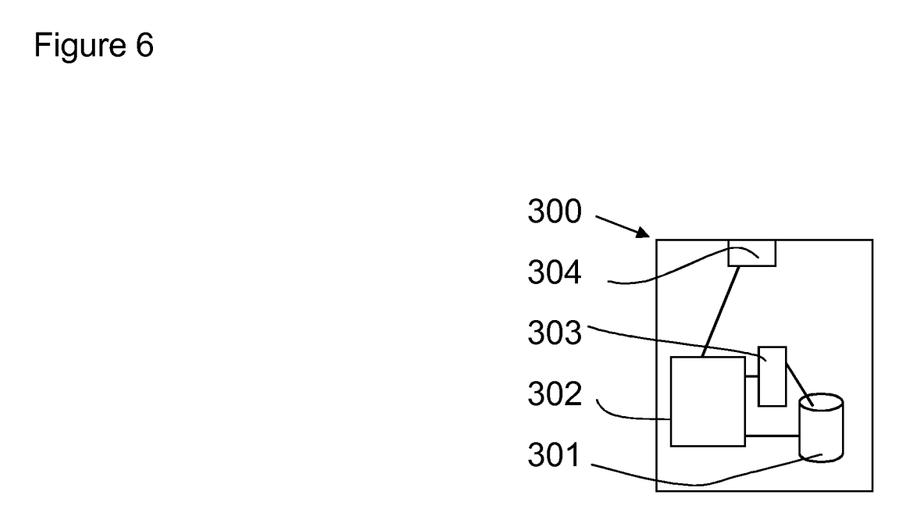
FIG. 6 shows an example of a control apparatus, according to an embodiment.

Embodiments described above by means of FIGS. 1 to 5 may be implemented on an apparatus, such as a node, host or server, or in a unit, module, etc. providing control functions as shown in FIG. 6 or on a mobile device (or in a unit, module etc. in the mobile device) such as that of FIG. 2. FIG. 6 shows an example of such an apparatus. In some embodiments, a base station comprises a separate unit or module for carrying out control functions. In other embodiments, the control functions may be provided by another network element such as a radio network controller or a spectrum controller. The apparatus 300 may be arranged to provide control on communications in the service area of the system. The apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the apparatus 300 may be configured to execute an appropriate software code to provide the control functions. Control functions may include at least providing, in dependence on a first subcarrier spacing of a first subframe structure, a second subcarrier spacing of a second subframe structure, wherein the first subframe structure has a first subframe length and at least one first cyclic prefix length and providing a second subframe length of the second subframe structure, the second subframe length comprising m symbols, wherein each symbol contains a second cyclic prefix, the second cyclic prefix length modified by a length variant.

Figure 7:
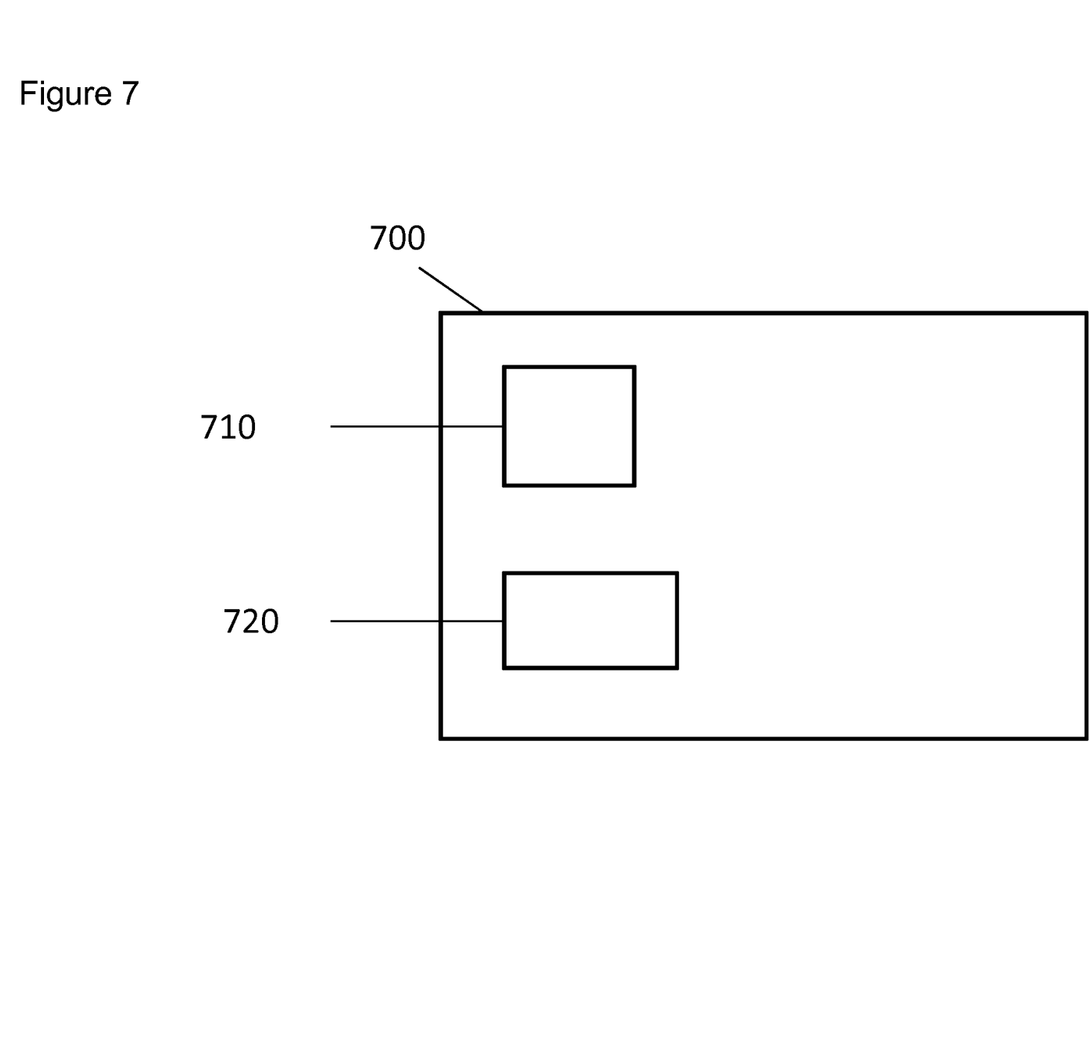
FIG. 7 shows a schematic diagram of an example apparatus.

An example of an apparatus 700, as shown in FIG. 7 may comprise means 710 for providing, in dependence on a first subcarrier spacing of a first subframe structure, a second subcarrier spacing of a second subframe structure, wherein the first subframe structure has a first subframe length and at least one first cyclic prefix length and means 720 for providing a second subframe length of the second subframe structure, the second subframe length comprising m symbols, wherein each symbol contains a second cyclic prefix, the second cyclic prefix length modified by a length variant.

It should be understood that the apparatuses may include or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G, similar principles can be applied to any other communication system or radio access technology. Embodiments are generally applicable where T-F scaling is supported. Although the example deals with cmWave, embodiments may be applicable at other frequency ranges (such as mmWave and below 10 GHz). Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments as described above by means of FIGS. 1 to 5 may be implemented by computer software executable by a data processor, at least one data processing unit or process of a device, such as a base station, e.g. eNB, or a UE, in, e.g., the processor entity, or by hardware, or by a combination of software and hardware. Computer software or program, also called program product, including software routines, applets and/or macros, may be stored in any apparatus-readable data storage medium or distribution medium and they include program instructions to perform particular tasks. An apparatus-readable data storage medium or distribution medium may be a non-transitory medium. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi core processor architecture, as non limiting examples.

Embodiments described above in relation to FIGS. 1 to 5 may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
providing, in dependence on a first subcarrier spacing of a first subframe structure, a second subcarrier spacing of a second subframe structure, wherein the first subframe structure has a first subframe length and at least one first cyclic prefix length; and
providing a second subframe length of the second subframe structure, the second subframe length comprising m symbols, wherein each symbol contains a second cyclic prefix, wherein a length of the second cyclic prefix is modified by a length variant,
wherein determining the second subcarrier spacing comprises applying a scaling factor n to the first subcarrier spacing, and
wherein providing the second subframe length comprises applying scaling factor n to the first subframe length, and a sum of second cyclic prefix length variants over M symbols is $(T_N-(M/\Delta f))$, where $\Delta f$ is second subcarrier spacing, $T_N$ is first subframe length divided by factor n and multiplied by factor N, wherein N is the number of subframes, and M is the number of symbols per $T_N$ in the second subframe structure.

2. The method according to claim 1, wherein n is equal to one of 2, 4, 5, 8 and 10.

3. The method according to claim 1, wherein providing the second subframe length comprises applying scaling factor n to the first subframe length, and the second cyclic prefix length variant is $(T_N-(M/\Delta f))/M$, where $\Delta f$ is second subcarrier spacing, $T_N$ is first subframe length divided by factor n and multiplied by factor N, wherein N is the number of subframes, and M is the number of symbols per $T_N$ in the second subframe structure.

4. The method according to claim 1, wherein second cyclic prefix length varies between symbols of the second subframe.

5. The method according to claim 1, wherein providing the second subframe length comprises applying scaling factor n to the first subframe length, and defining second subframe length as (x*(first subframe length))/y, wherein x and y are positive integers.

6. The method according to claim 1, wherein the second cyclic prefix length variant is dependent on targeted delay spread of the radio channel, tolerated cyclic prefix overhead and alignment of second subframe length and LTE radio frame.

7. The method according to claim 1, wherein the first subframe length comprises m symbols.

8. The method according to claim 7, wherein m=12 or m=14.

9. The method according to claim 8, wherein:
when m=14, a procedure defined for LTE/normal cyclic prefix length is applied for the second subframe structure; and
when m=12, a procedure defined for LTE/extended cyclic prefix length is applied for the second subframe structure.

10. The method according to claim 1, wherein symbol length is proportional to the second subcarrier spacing.

11. A computer program product embodied on a non-transitory computer-readable medium, in which a computer program is stored which, when being executed by a computer, is configured to cause an apparatus to:
provide, in dependence on a first subcarrier spacing of a first subframe structure, a second subcarrier spacing of a second subframe structure, wherein the first subframe structure has a first subframe length and at least one first cyclic prefix length; and
provide a second subframe length of the second subframe structure, the second subframe length comprising m symbols, wherein each symbol contains a second cyclic prefix, the second cyclic prefix length modified by a length variant, wherein determining the second subcarrier spacing comprises applying a scaling factor n to the first subcarrier spacing, and wherein providing the second subframe length comprises applying scaling factor n to the first subframe length, and a sum of second cyclic prefix length variants over M symbols is ($T_N$−(M/Δf)), where Δf is second subcarrier spacing, $T_N$ is first subframe length divided by factor n and multiplied by factor N, wherein N is the number of subframes, and M is the number of symbols per $T_N$ in the second subframe structure.

12. An apparatus comprising:
at least one processor; and
at least one memory including computer program code; the at least one memory and the computer program code configured to, with the at least one processor, cause the apparatus at least to:
provide, in dependence on a first subcarrier spacing of a first subframe structure, a second subcarrier spacing of a second subframe structure, wherein the first subframe structure has a first subframe length and at least one first cyclic prefix length; and
provide a second subframe length of the second subframe structure, the second subframe length comprising m symbols, wherein each symbol contains a second cyclic prefix, the second cyclic prefix length modified by a length variant, wherein determining the second subcarrier spacing comprises applying a scaling factor n to the first subcarrier spacing, and wherein providing the second subframe length comprises applying scaling factor n to the first subframe length, and a sum of second cyclic prefix length variants over M symbols is ($T_N$−(M/Δf)), where Δf is second subcarrier spacing, $T_N$ is first subframe length divided by factor n and multiplied by factor N, wherein N is the number of subframes, and M is the number of symbols per $T_N$ in the second subframe structure.

13. The apparatus according to claim 12, wherein n is equal to one of 2, 4, 5, 8 and 10.

14. The apparatus according to claim 12, wherein providing the second subframe length comprises applying scaling factor n to the first subframe length, and the second cyclic prefix length variant is ($T_N$−(M/Δf))/M, where Δf is second subcarrier spacing, $T_N$ is first subframe length divided by factor n and multiplied by factor N, wherein N is the number of subframes, and M is the number of symbols per $T_N$ in the second subframe structure.

15. The apparatus according to claim 12, wherein second cyclic prefix length varies between symbols of the second subframe.

16. The apparatus according to claim 12, wherein providing the second subframe length comprises applying scaling factor n to the first subframe length, and defining second subframe length as (x*(first subframe length))/y, wherein x and y are positive integers.

* * * * *